United States Patent
Neugschwandtner et al.

(10) Patent No.: US 11,977,889 B2
(45) Date of Patent: May 7, 2024

(54) METHOD FOR CONTROL FLOW ISOLATION WITH PROTECTION KEYS AND INDIRECT BRANCH TRACKING

(71) Applicant: Oracle International Corporation, Redwood Shores, CA (US)

(72) Inventors: Matthias Neugschwandtner, Perchtoldsdorf (AT); William Blair, Washington, DC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/882,007

(22) Filed: Aug. 5, 2022

(65) Prior Publication Data

US 2024/0045679 A1   Feb. 8, 2024

(51) Int. Cl.
*G06F 9/30* (2018.01)
*G06F 9/455* (2018.01)
*G06F 21/54* (2013.01)

(52) U.S. Cl.
CPC ...... *G06F 9/30058* (2013.01); *G06F 9/30047* (2013.01); *G06F 9/45541* (2013.01); *G06F 21/54* (2013.01)

(58) Field of Classification Search
CPC ............. G06F 9/30058; G06F 9/30047; G06F 9/45541; G06F 21/54
See application file for complete search history.

(56) References Cited

U.S. PATENT DOCUMENTS

| | | | |
|---|---|---|---|
| 11,340,901 B2* | 5/2022 | Piry | G06F 21/54 |
| 2019/0205136 A1* | 7/2019 | Hu | G06F 9/35 |
| 2021/0200546 A1* | 7/2021 | Lemay | G06F 9/45558 |
| 2021/0264020 A1* | 8/2021 | LeMay | G06F 21/53 |

OTHER PUBLICATIONS

Kim et al.; Refining Indirect Call Targets at the Binary Level; 2021 (Year: 2021).*
Cha et al.; How'd Security Benefit Reverse Engineers ?; Jun. 2022; IEEE (Year: 2022).*

(Continued)

*Primary Examiner* — Corey S Faherty
(74) *Attorney, Agent, or Firm* — Hickman Becker Bingham Ledesma LLP; Brian Miller

(57) ABSTRACT

Herein is innovative control flow integrity (CFI) based on code generation techniques that instrument data protection for access control of subroutines invoked across module boundaries. This approach is counterintuitive because, even though code is stored separately from data, access control to the data is used to provide access control to the code. In an embodiment, an instrumentation computer generates, at the beginning of a subroutine that is implemented in machine instructions, a prologue that contains: a first instruction of the subroutine that indicates that the first instruction is a target of a control flow branch and a second instruction of the subroutine that verifies that a memory address is accessible. Generated in the machine instructions are instruction(s) that, when executed by a processor, cause the memory address to have limited accessibility. Some code generation may be performed at the start of runtime by a loader or a dynamic linker.

32 Claims, 8 Drawing Sheets

(56) References Cited

OTHER PUBLICATIONS

Tice et al., "Enforcing Forward-Edge Control-Flow Integrity in GCC & LLVM", 23rd USENIX Security Symposium, Aug. 2014, 16 pages.
Sun et al., "How to Survive the Hardware-assisted Controlflow Integrity Enforcement", 2019, 61 pages.
Abadi et al., "Control-Flow Integrity: Principles, Implementations, and Applications", 2009, 14 pages.
"Paging", Chapter 4, vol. 3A, Dated Jun. 1, 2022, 4 pages.
"Control-Flow Enforcement Technology (CET)", Chapter 18, vol. 1, Dated Jun. 1, 2022, 14 pages.

* cited by examiner

METHOD FOR CONTROL FLOW ISOLATION WITH PROTECTION KEYS AND INDIRECT BRANCH TRACKING

FIELD OF THE INVENTION

The present invention relates to control flow integrity (CFI). Herein are code generation techniques that instrument data protection for access control of subroutines invoked across module boundaries.

BACKGROUND

From a security perspective, if one component of a computer program is compromised by exploiting a vulnerability, the intrusion may affect other components in the computer program. The following are two real-world scenarios where such an uncontained security breach may occur.

The first scenario is shared libraries. In modern software the following is almost always the case. In order not to reinvent the wheel, programmers use a multitude of libraries that provide needed reusable functionality such as compression, machine learning, encryption, and data storage. If a vulnerability in the compression algorithm is exploited, the attack may subsequently use code from the data storage library.

The second scenario is multitenant middleware such as web servers, which naturally consist of multiple components that have varying requirements to access sensitive information. For example, the web server component responsible for handling authentication material is a part of server initialization that may be maliciously executed after initialization of the server. In this setting, a compromised first tenant may arbitrarily execute code belonging to a second tenant beyond what is permitted by the application of the first tenant.

In a more specific example, after exploiting a bug in a dynamic scripting language runtime environment located in a server process, an adversary attempts to jump into an authentication module in order to exfiltrate sensitive data that would allow impersonation of the host.

A major problem with state of the art software-based fault isolation (SFI) is significant performance overhead in time and space due to various impeding factors such as hardware independence and instrumentation proliferation to many call sites that invoke a same sensitive subroutine. For example, a jump table for call sites may designate valid jump targets. Instrumentation at each call site may further limit the call site to specific targets in the jump table with masking operations.

DETAILED DESCRIPTION

Figure 1:
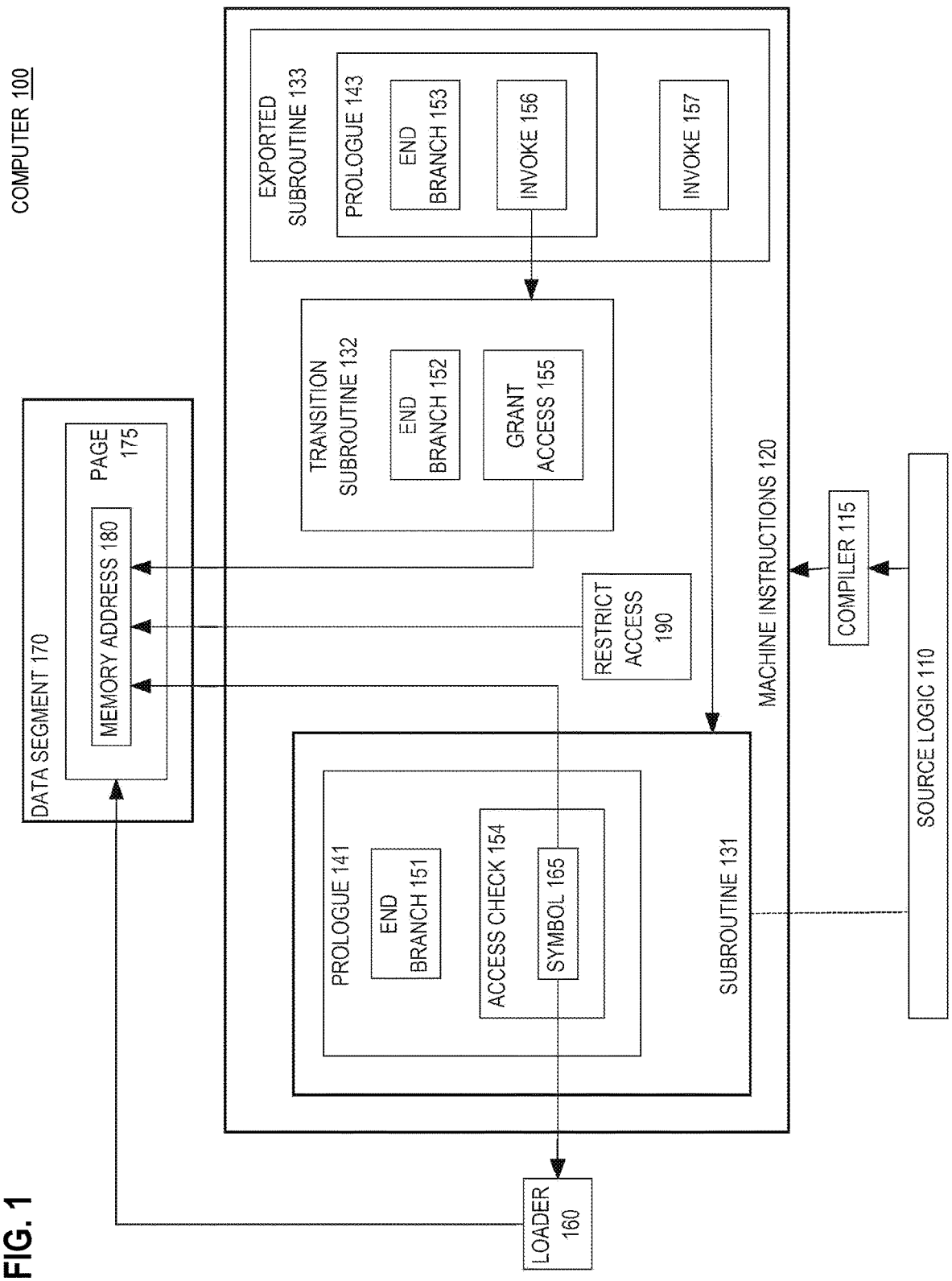
FIG. 1 is a block diagram that depicts an example computer that uses code generation techniques that instrument data protection for access control of subroutines invoked across module boundaries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is innovative control flow integrity (CFI) based on code generation techniques that instrument data protection for access control of subroutines invoked across module boundaries. This approach is counterintuitive because, even though code is stored separately from data, access control to the data is used to provide access control to the code. Intra-process fault isolation herein is a way of partitioning a process to separate components of different concerns to contain misbehaving components.

In addition to partitioning a process address space between different software components, either by partitioning shared libraries loaded by a software application or by isolating individual components that comprise the application, techniques herein provide a way for temporarily granting individual computational threads respective access to separate components. For example, if the components are shared libraries, an application can grant a thread temporary access to a particular shared library. This ensures that the shared library does not attempt to jump to code outside of the library, and that the thread must eventually return to the main application. Otherwise, a monitor will raise an alert or terminate the workload.

When components take the form of individual modules of an executable, application developers can enforce strict security policies that govern which modules are permitted to process sensitive material, and guarantee that no sensitive material leaves the module after relinquishing or revoking access. This may be accomplished by ensuring that all control flow paths leaving the protected module enforce proper sanitization so that sensitive material cannot be leaked in general purpose registers or in accessed memory regions.

In an embodiment, Intel memory protection keys (MPK or pkeys) are used herein to extend virtual memory page-table permissions and to allow partitioning the address space of a program into subdomains with restricted access control. This partly facilitates fault isolation of components from one another. While regular data access can be restricted with pkeys, pkeys by themselves do not support restricting execution of code. Another technology used herein is Intel indirect branch tracking (IBT) that facilitates restricting the indirect control flow targets of an application to an allowed subset, but cannot distinguish between different allowed subsets, thus also not restricting execution in a way that is sufficient for full fault isolation.

The approach herein remedies those shortcomings and combines both technologies in a novel way to actually achieve full fault isolation by introducing a data dependency for (indirect) branches. This data dependency is then subject to the MPK mechanism and will fail on invalid transfers. Because this approach can leverage particular hardware, executable code is smaller and much faster than state of the art software-based fault isolation (SFI).

In an embodiment, MPK extends page-table permissions such that every page can be tagged with one of sixteen protection keys. A thread-local register maps each of these protection keys to an access permission. Access can either be denied entirely or only granted for reads and/or writes. Because the permissions are stored in a thread-local register, a permission change does not require a translation lookaside buffer (TLB) flush, and different permissions can be set for different threads. Additionally, the register can be changed with a dedicated instruction, write pkey register unit (WRPKRU) from user mode, causing little overhead. However, protection keys are unused for instruction fetch and thus cannot be used by themselves (i.e. without innovations herein) to restrict execution.

In an embodiment, IBT enforces forward-edge control flow integrity. Once enabled, the central processing unit (CPU) will fault if an indirect control flow transfer, i.e. a call or jmp targets an instruction sequence that starts with an ENDBRANCH (e.g. ENDBR64) instruction. In contrast to other CFI approaches, IBT only knows one target "color" such that a target is either valid or invalid. IBT cannot by itself (i.e. without innovations herein) distinguish between multiple subsets of valid targets.

The approach herein combines MPK and IBT to achieve fault isolation for control flow by introducing a data dependency on indirect branches. This entails introducing a novel prologue at all valid control flow targets. With IBT, this prologue cannot be bypassed because the prologue always starts with an ENDBRANCH instruction. The prologue performs an innovative data access to what is referred to herein as a domain page, which is a novel artifact. This page is located at an immutable address and tagged with the protection key corresponding to the current fault domain. If a callee from a different fault domain with a different protection key tries to jump to a forbidden target in the current domain, the data access to the domain page will fail and a signal will be raised to handle the faulty control flow transfer attempt.

Because this approach is call target oriented, instead of call site oriented per the state of the art, this approach scales better to original codebase complexity with smaller and faster instrumentation. Advantages of this hardware based solution are as follows.

- It is less error-prone to implement, because the compiler only needs to insert a data dependency in the function prologue, in contrast to the software-based approaches that also need to instrument the call site. Herein, there are no dedicated jump tables.
- Without call site instrumentation, this solution causes less performance overhead. Compared to the original software-based mechanism, a data dependency only accesses a limited set of pages and does not pollute the data cache. In other words, instrumentation herein has a smaller working set of data (e.g. metadata).
- This approach can dynamically switch fault isolation boundaries by quickly setting the corresponding entries in the protection key register, and thus temporarily grant access to other domains.
- This approach is readily retrofitted to protection keys that are already in use (for other application purposes) to isolate the memory regions used to isolate different components from one another.

In an embodiment, an instrumentation computer generates, at the beginning of a subroutine that is implemented in machine instructions, a prologue that contains: a first instruction of the subroutine that indicates that the first instruction is a target of a control flow branch and a second instruction of the subroutine that verifies that a memory address is accessible. Generated in the machine instructions are instruction(s) that, when executed by a processor, cause the memory address to have limited accessibility.

In various embodiments, instrumentation may provide control flow integrity (CFI) based on data protection for access control of subroutines invoked across module boundaries. Some code generation may be performed at the start of runtime by a loader or a dynamic linker. In an embodiment, the operating system (OS) is Unix and the central processing unit (CPU) is Intel x86.

1.0 Example Computer

FIG. 1 is a block diagram that depicts an example computer 100, in an embodiment. For control flow integrity (CFI), computer 100 uses code generation techniques that instrument data protection for access control of subroutines invoked across module boundaries. Computer 100 may be one or more of a rack server such as a blade, a personal computer, a mainframe, a virtual computer, or other computing device.

In this example, computer 100 dynamically controls availability of invoking subroutine 131 such as a procedure, a function, or a method. In various scenarios, computer 100 selectively and dynamically can grant or revoke access to subroutine 131. For example at various times, subroutine 131 may or may not be: a) invokable only from callers (e.g. call sites) in a same library that contains subroutine 131, b) invokable only from particular other libraries, c) invokable only by particular computational threads, and/or d) invokable only at particular times or for particular durations.

1.1 Subroutine Call

Subroutine 131 contains instrumentation, generated by computer 100, that enforces access control and control flow integrity (CFI). Subroutine 131 contains a sequence of instructions such as machine instructions of an instruction set architecture (ISA) of a central processing unit (CPU). An ordinary invocation of subroutine 131 should start by executing the first instruction in that sequence, which a caller that invokes subroutine 131 can expressly cause. For example, the caller may use an instruction of the ISA such as CALL or jump to subroutine (JSR) that specifies the memory address of the first instruction of subroutine 131 as an invocation target.

A caller may intentionally or accidentally malfunction by instead specifying the address of an instruction in subroutine 131's instruction sequence that is not the first instruction, which is invalid but more or less impossible to dynamically detect without CFI. Detection by CFI of a call beyond the first instruction in subroutine 131's instruction sequence should be a dynamic detection because the target address specified in the call instruction may have been dynamically computed.

CFI also should forbid execution of the first instruction in subroutine 131's instruction sequence in invalid ways. The caller should not cause that first instruction to execute without using an appropriate instruction such as CALL. For example, the following ways may or may not be forbidden in various embodiments: a) resetting the program counter (PC) register of the CPU to point to the first instruction in subroutine 131's instruction sequence, b) passively letting the PC be automatically incremented so that execution continues (i.e. falls thru) to that first instruction or, in some embodiments, c) specifying the address of that first instruction in a (e.g. conditional) branch instruction instead of in a call instruction.

For CFI, the first instruction in subroutine 131's instruction sequence should be the first (e.g. only) instruction in end branch 151 that may be a sequence of one or more instructions. If the ISA is Intel x86, end branch 151 may be a single ENDBR instruction whose execution fails (e.g. throws an exception, raises a signal, or causes a fault) if improperly reached during execution as discussed above. If end branch 151 is validly executed according to CFI, then end branch 151 itself has no effect and is similar to a no operation (NOP) instruction.

End branch 151 ensures that subroutine 131 is only invoked as a subroutine, which increases security. However, Intel's ENDBR instruction does not detect the identity of the caller nor the context of the call, which would further increase security. Such enforcement functionality is instead provided by access check 154 that is one or more instructions that dynamically enforce that the caller and the context of the call are currently permitted.

Unlike ENDBR that has fixed behavior, access check 154 may have somewhat dynamic behavior. For example, the caller may repeatedly invoke subroutine 131 in respective iterations of a loop, and access may be suddenly revoked (e.g. leased access expires as discussed later herein) such that access check 154 may succeed only during some iterations of the loop.

1.2 Access Control with Domain Page

Access check 154 provides access control of subroutine 131 by associating subroutine 131 with a memory portion that in various embodiments is: a) memory address 180, b) page 175 that contains memory address 180, or c) data segment 170 that contains only data pages (i.e. not code pages as discussed below) such as page 175. That memory portion has memory access control provided by component(s) of computer 100 such as the CPU, virtual memory, and/or the operating system (OS).

Access to that memory portion is restricted as configured by restrict access 190 that is one or more instructions. As discussed below, restrict access 190 and subroutine 131's instruction sequence are contained in machine instructions 120. At runtime at least before subroutine 131 can execute (e.g. when machine instructions 120 is loaded into (e.g. volatile) memory), restrict access 190 executes to limit the accessibility of whichever of memory portions 170, 175, or 180 (i.e. the shown embodiment) is the finest granularity of data protection natively provided by virtual memory or the OS. If the OS is Unix and the CPU is Intel x86, then restrict access 190 may instead affect page 175 as a whole, which does not alter the use and purpose of memory address 180 as discussed below.

Access check 154 succeeds or fails if the thread attempting execution of subroutine 131 respectively can or cannot access memory address 180, even though the caller necessarily can read at least instructions 151 and 154 in subroutine 131. In other words, subroutine 131 uses memory address 180 as a proxy for delegating access control.

As follows, access check 154 is an improved alternative instead of directly restricting access to subroutine 131 such as with virtual memory. For example, different subroutines may have different instances of access check 154 that are associated with same or different memory addresses, which facilitates fine-grained access control of a few subroutines together or arbitrary-grained access control of dozens or hundreds of subroutines together as a unit. Whereas, a virtual memory page has a fixed granularity that may be inconvenient. For example, two subroutines may contain respective instances of access check 154, and both instances may be associated with same memory address 180.

Thus, access control of both subroutines may be synchronized and centralized. Conversely, the two subroutines may reside together in a same code page and, if their instances of access check 154 are associated with different memory addresses, then access control of both subroutines may, unlike the state of the art, be independent from each other.

Virtual memory typically separates instructions (a.k.a. code or text) and data into separate sets of pages. For example, state of the art security for instructions may entail a memory management unit (MMU) maintaining a page table whose entries specify access control for particular respective pages. Each executing user process may have its own set of page table entries such that one process may have access to a page that another process cannot access.

The state of the art may deny a process access to a code page that contains subroutine 131's instruction sequence. In other words, the state of the art for code access control is based on page table entries of code pages. Access check 154 is novel and counter-intuitive because it may deny a process access to subroutine 131 based instead on securing data page 175, which is not a code page and does not contain instructions. In data page 175, memory address 180 does not contain an instruction.

In combination, instructions 151 and 154 provide access control of subroutine 131 with unprecedented dynamism, flexibility, and granularity. End branch 151 ensures that no caller can bypass the instruction(s) of access check 154. Instructions 151 and 154 are instrumentation that should occur in subroutine 131's instruction sequence before all of instructions of the actual logic of subroutine 131, which occur later in that instruction sequence. In an embodiment, instructions 151 and 154 are adjacent to each other.

1.3 Subroutine Prologue and Machine Instructions

Prologue 141 is instrumentation that should occur at the beginning of subroutine 131's instruction sequence. Prologue 141 contains an instruction sequence that starts with end branch 151 and also contains access check 154. Instructions of the actual logic of subroutine 131 execute only after prologue 141 successfully executes.

Depending on the embodiment, the lifecycle of subroutine 131 may have a sequence of various phases discussed herein. For example, source logic 110 may originally define subroutine 131 in a general purpose programming language in any of varying degrees of abstraction ranging from: a) a high level language (HLL) such as C, C++, or Java, b) a low level language such as assembly language or Forth, or c) an intermediate representation (IR) such as Java bytecode or low level virtual machine (LLVM) bitcode.

Compiler 115 contains a backend that generates machine instructions 120 from source logic 110 that a frontend of compiler 115 accepts. Machine instructions 120 may be: a) instructions of an ISA of a CPU, b) bitcode, or c) assembly language instructions. The following are various demonstrative example embodiments of compiler 115.

a) Source logic 110 is Java and machine instructions 120 is instructions of an ISA of a CPU.

b) Source logic 110 is bytecode and machine instructions 120 is instructions of an ISA of a CPU.

c) Source logic 110 and machine instructions 120 both are assembly language.

d) Source logic 110 and machine instructions 120 both are bitcode.

Herein, instrumentation may be any artifact that was: a) generated by computer 100 to support subroutine 131 and b) not originally defined in source logic 110. Besides generating subroutine 131's instruction sequence while generating machine instructions 120, compiler 115 may generate, in machine instructions 120, other subroutines 132-133 that are undefined in source logic 110.

As explained earlier herein and before subroutine 131 can execute, restrict access 190 configures at least memory address 180 to be mostly or entirely inaccessible. For example, restrict access 190 may initially configure memory address 180 to be universally unreadable or readable only by logic contained in a same domain.

1.4 Granular Artifacts: Domain, Module, and Library

Herein, a domain is a subset of an executable program's subroutines. The executable may be partitioned into a set of domains that each contain a disjoint (i.e. nonoverlapping) subset of the program's logic.

Herein, a domain is the unit protected by access control. Machine instructions 120 is part of exactly one domain. In various embodiments, a domain may be an artifact that contains machine instructions 120 such as a linkable (e.g. object module) module or (e.g. multi-module) library. Modules and libraries are discussed later herein.

In any case, some or all callers may initially be unable to execute subroutine 131 due to restrict access 190. Transition subroutine 132 is instrumentation that can selectively (e.g. temporarily) grant access to subroutine 131. Transition subroutine 132 contains an instruction sequence that begins with end branch 152. End branches 151-153 may be identical instances in respective subroutines 131-133.

Transition subroutine 132's instruction sequence also contains grant access 155 that is one or more instructions that configure one, depending on the embodiment as explained earlier herein, of memory portions 170, 175, or 180 to be accessible according to mechanisms that restrict access 190 used. Particular example mechanisms are discussed later herein. In other words, some callers may be unable to use subroutine 131 unless transition subroutine 132 has appropriately (e.g. recently) executed.

1.5 Domain Boundary

A (e.g. third party) library is a reusable part of a codebase as discussed later herein. In an embodiment, machine instructions 120 may be a linkable (e.g. multi-page) code segment such as in a module or library. Subroutines 131-132 may be local (i.e. not exported) to machine instructions 120 (or the module or library that contains machine instructions 120) such that subroutines 131-132 are hidden (i.e. not directly usable) from logic outside of, depending on the embodiment, that library, that module, or machine instructions 120. In other words outside logic, even though in the same process address space, effectively can call neither of subroutines 131-132. Likewise, memory address 180 need not be exported.

Entry from outside should occur only through instrumentation such as exported subroutine 133 that is exported (i.e. externally visible such as symbolically at link time). Exported subroutine 133 contains an instruction sequence that begins with prologue 143 that begins with end branch 153.

Prologue 143 also contains invoke 156. Invokes 156-157 each is one or more instructions that respectively call subroutines 132 and 131 in that ordering. Thus with authorization techniques discussed later herein, a caller can indirectly invoke subroutine 131 by instead calling exported subroutine 133.

1.6 Tool Chain

In an embodiment such as discussed later herein, memory address 180 is unknown to compiler 115 such that compiler 115 generates access check 154 that refers to memory address 180 instead as unresolved symbol 165 that a dynamic linker or loader 160 may eventually resolve. For example, symbol 165 may be a placeholder that loader 160 resolves to memory address 180 while loading machine instructions 120. Loader 160 is discussed later herein.

Tools 115 and 160 are respectively used at build time and at runtime, which are different phases in the lifecycle of subroutine 131. Although tools 115 and 160 are shown as being part of same computer 100, tools 115 and 160 may instead be part of separate respective computers per a usual software development lifecycle (SDLC). In other words, one computer may generate some or all of machine instructions 120 that another computer executes. In a cross-compiled embodiment, both computers have a different respective OS and/or a different respective ISA.

2.0 Example Domain Instrumentation

Figure 2:
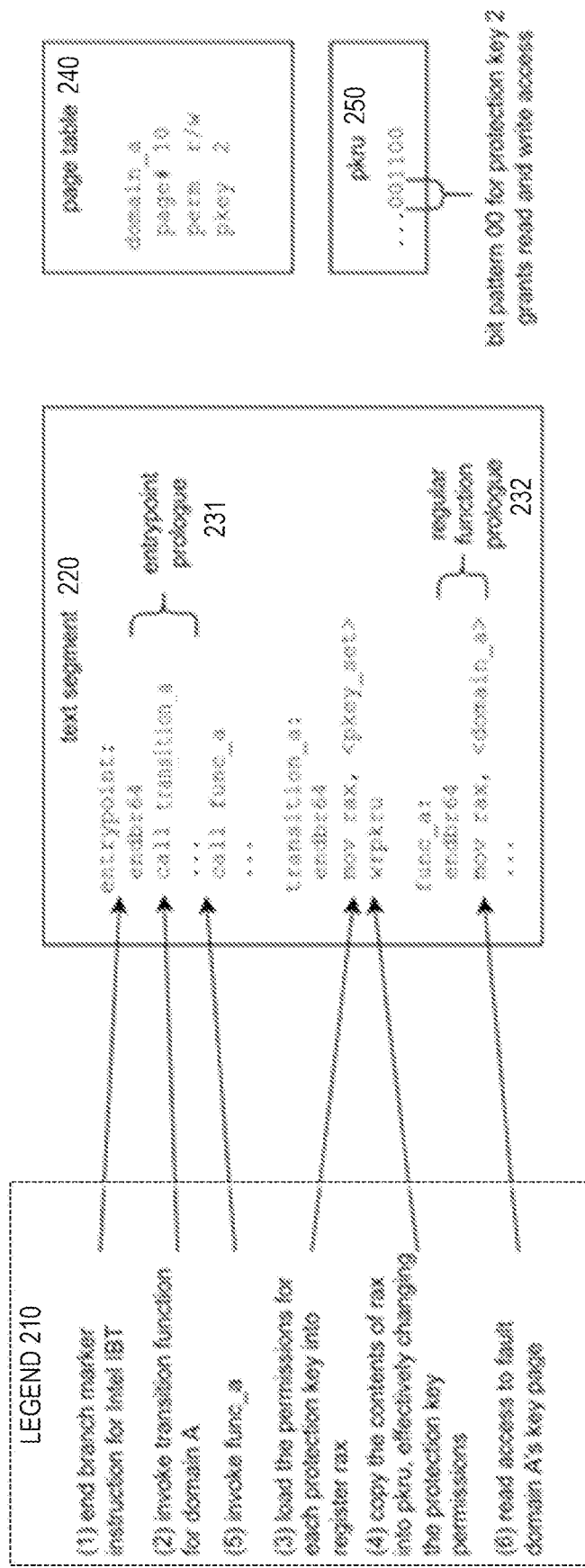
FIG. 2 is a block diagram that depicts an example runtime computer that executes instrumentation.

FIG. 2 is a block diagram that depicts an example runtime computer 200 that executes instrumentation, in an embodiment. In computer 200, the OS is Unix and the CPU is Intel x86. FIG. 2 is discussed with reference to FIG. 1. Computer 200 may be an implementation of computer 100.

At runtime, Unix provides virtual memory that contains data pages such as page 175 and code pages as discussed earlier herein. Intel x86 organizes pages of an executable program into data segment 170 and text (a.k.a. code) segment 220 that contains machine instructions 120.

Text segment 220 contains the following.

Entrypoint is exported subroutine 133.

Entrypoint prologue 231 is prologue 143.

Transition_a is transition subroutine 132.

Func_a is subroutine 131.

Regular function prologue 232 is prologue 141.

Unix maintains page table 240 that may map virtual memory pages respectively to physical memory pages. Each virtual memory page has an entry in page table 240. In this example, page table 240 is demonstratively abridged to show only a page table entry for page 175 in FIG. 1.

The page table entry specifies the following.

Ten as the virtual page number of page 175, which is the most significant bits of the address of page 175 (and of memory address 180).

The physical page number (not shown) of a physical memory page to which the virtual page number is mapped.

Access permissions, e.g. "r/w" permits read and write.

Which memory protection key (pkey) to use (e.g. 2).

Intel x86 has sixteen pkeys that are numbered 0-15, which can be encoded as four identifier bits. A pkey contains two permission bits, each respectively for read permission and write permission. The page table entry stores the number that identifies which pkey, but the page table entry does not store the two permission bits of the pkey itself.

Read access to page 175 is permitted only if the page table entry and the pkey both unanimously concur that reads are allowed. If only one in both the page table entry and the pkey grant read permission, then reading page 175 is forbidden. Write permission entails a similar unanimity mechanism.

As shown, page table 240 specifies that page 175 is protected by pkey 2. All pkeys are stored together in pkey register unit (PKRU) 250. That is, the pairs of permission bits in all of the pkeys are concatenated as shown PKRU 250. Immediately adjacent to the ellipsis shown in PKRU 250 are the two permission bits of pkey 2.

As shown, the two permission bits of pkey 2 are 00, which means that both read and write of page 175 are forbidden. By treating PKRU 250 as an array whose elements are two-bit pkeys, a pkey number can be used as an array offset to access a particular pkey in PKRU 250.

Unix provides multitasking by preemptive context switching between ready execution contexts such as processes or threads. For example, two execution contexts may share a CPU or processor core by alternating their executions across alternating time slices such that only one execution context runs during each time slice. In that way, the first execution context and the second execution context take alternating turns executing.

A context switch occurs in two phases. The first phase entails pausing the running first execution context and saving (e.g. in volatile memory) a copy of its register file (i.e. the contents of all registers in the CPU). A register file is a solid state hardware structure that is a bank of multiple registers (including PKRU 250) of the CPU. A register file is not a filesystem file.

The second phase entails loading the register file with a previously saved copy of the register file of the second execution context and resuming running the second execution context. Thus, both execution contexts may effectively have their own private instance of the PKRU.

In other words, PKRU 250 may be thread local. Thus, each thread may have its own instance of pkey 2, and those multiple instances of pkey 2 may have different values for the two permission bits of pkey 2. For example with two simultaneously existing instances of pkey 2, one instance of pkey 2 may permit reads, and the other instance of pkey 2 may forbid reads.

Which of those two instances of pkey 2 is operative depends on which of the two threads currently runs, which can change by a context switch. Context switching does not affect page table 240. For example, the page table entry may specify that reading page 175 is forbidden. In that case, context switching from an instance of pkey 2 that forbids reading page 175 to a different instance of pkey 2 that permits reading page 175 will have no affect on the readability of page 175 that will remain unreadable for both threads.

Legend 210 is shown with a dashed outline to indicate that legend 210 is demonstrative and not actually stored in computer 200. Legend 210 shows steps 1-6 that, although vertically shown unordered (e.g. step 5 is shown between steps 2-3), sequentially occur at runtime when a caller calls the entrypoint (i.e. exported subroutine 133).

First, exported subroutine 133 performs steps 1-2 that cooperatively execute entrypoint prologue 231. Step 1 executes only an ENDBR64 instruction that is end branch 153 in FIG. 1. Step 2 executes invoke 156 that calls transition_a that is transition subroutine 132.

Next, transition_a performs steps 3-4. Although a context switch was discussed above as a way to replace the contents of PKRU 250, steps 3-4 cooperate to instead replace the contents of PKRU 250 without a context switch. Step 3 stages new contents (shown as pkey_set) to be transferred into PKRU 250. Techniques for tracking and adjusting pkey_set are discussed later herein.

Step 3 sets the staged value of the two permission bits of pkey 2. Depending on embodiments discussed later herein, step 3 may also preserve, discard, or temporarily override the values of other pkeys.

Step 4 executes only a write PKRU (WRPKRU) instruction that copies the new contents into PKRU 250 that, at least for the current execution context, may have an immediate effect on the accessibility of all pages (including page 175) protected by pkeys. Depending on which variant of x86 is used, WRPKRU requires 11-260 processor cycles to execute, which may be an order of magnitude faster than changing the permissions in the page table entry. That is because, WRPKRU is a user mode instruction, whereas adjusting the page table entry requires switching back and forth between user mode and kernel mode and requires flushing a translation lookaside buffer (TLB) that is a cache of frequently or recently used page table entries in page table 240, all of which is slow.

Additionally, the page table entry is global (i.e. not thread local), but PKRU 250 is thread local, which provides finer granularity of access control. Because the page table entry and PKRU 250 have different respective scopes (i.e. global and local), their scopes may be somewhat orthogonal. For example, two page table entries that specify identical permissions may specify different pkeys that specify different permissions. Likewise, the two page table entries may specify different permissions but also specify sharing the same pkey. Thus, a pkey may be shared by many pages. Typically, each domain (discussed earlier herein) has its own pkey that all of the pages in that domain share.

Next, control flow returns to exported subroutine 133 that performs step 5 that performs invoke 157 that calls func_a that begins by executing regular function prologue 232 that performs step 6.

Step 6 executes only access check 154 that attempts to access (e.g. read or write) memory address 180 that protects domain_a. Step 6 succeeds only if the page table entry and pkey 2 unanimously concur that accessing page 175 is permitted. Otherwise, step 6 fails, which causes a fault that prematurely terminates execution of func_a. If step 6 succeeds, then func_a may fully execute.

In this example, steps 3 and 6 coincidentally both use register rax, which is not necessarily intentional. Step 3 must use register rax as the WRPKRU instruction of step 4 expects, but step 6 may use any register or no register, so long as step 6 accesses memory address 180.

3.0 Example Instrumentation Lifecycle

Figure 3:
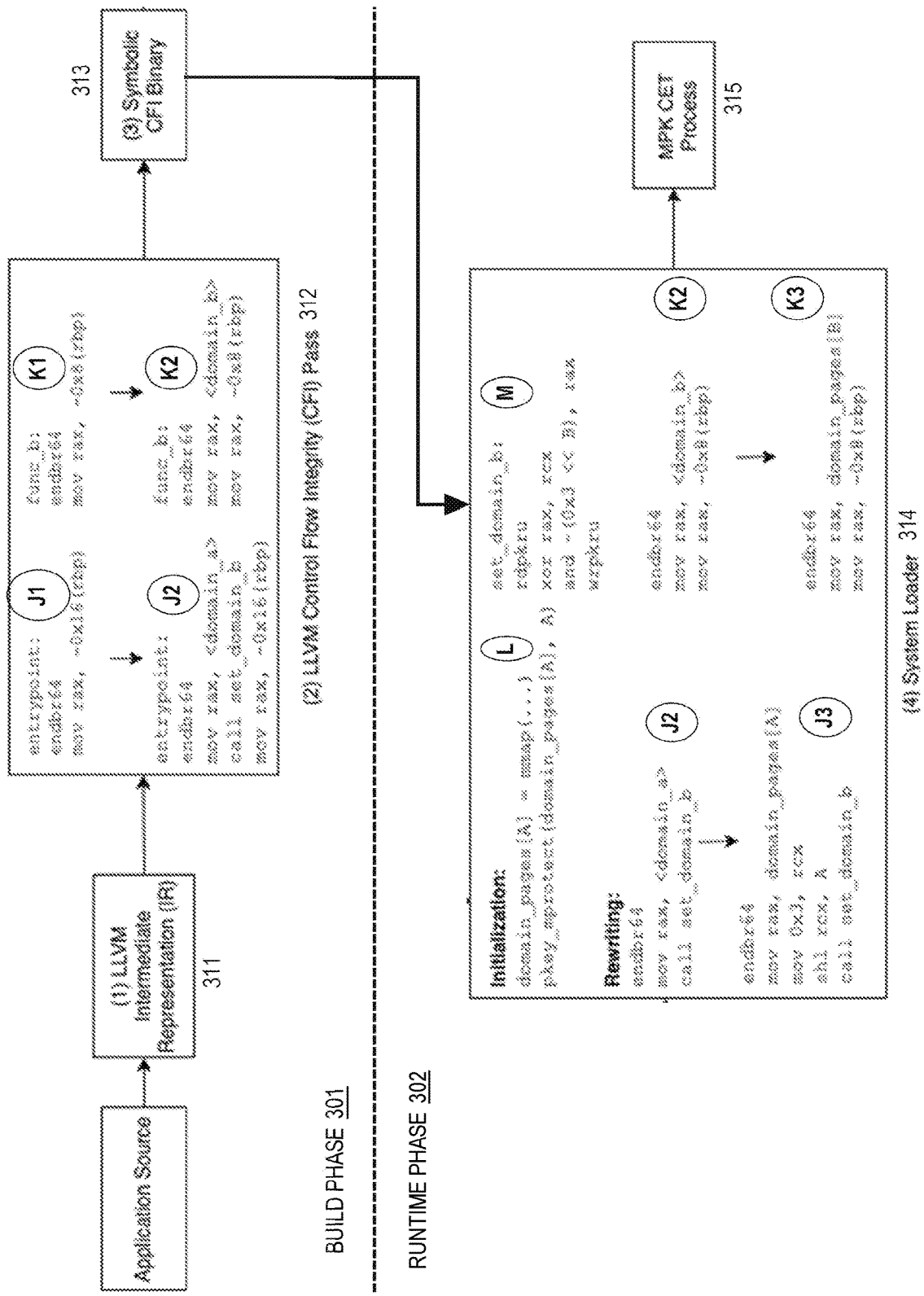
FIG. 3 is a flow diagram that depicts an example instrumentation lifecycle.

FIG. 3 is a flow diagram that depicts an example instrumentation lifecycle in example computer 300, in an embodiment. In computer 300, the OS is Unix and the CPU is Intel x86. FIG. 3 is discussed with reference to FIGS. 1-2. Computer 300 may be an implementation of computer 100.

The linear flow of FIG. 3 includes build phase 301 that is eventually followed by runtime phase 302. Each of phases 301-302 performs its own respective instrumentation pass.

In build phase 301, compiler 115 compiles source logic 110 that is shown as application source. That compilation generates LLVM IR 311 that is bitcode that is internal to compiler 115 and not yet ready to be serialized (e.g. persisted). Although not shown, LLVM IR 311 contains J1 (generated by compiler 115) and K1 as discussed below.

In this example, compiler 115 applies CFI pass 312 to insert instrumentation into LLVM IR 311, which involves the following.

Entrypoint is exported subroutine 133.
J1 is entrypoint before CFI pass 312.
J2 is entrypoint after CFI pass 312.
Func_b is subroutine 131.
K1 is func_b before CFI pass 312.
K2 is func_b after CFI pass 312.

In J1, -0x16(rbp) is addressing relative to the register base pointer (RBP) that is a stack frame pointer register. The negative sign indicates which direction in the stack to access.

J2 contains two MOV instructions. The first MOV instruction is not access check 154 as discussed below, but is a similar access check that enforces that the caller already has access to domain_a (which is not necessarily domain_a in FIG. 2). The CALL instruction in J2 switches the current domain to domain_b. In other words, J2 crosses from domain_a to domain_b in a secure way.

K2 contains two MOV instructions. The first MOV instruction is access check 154 that enforces that the caller already has access to domain_b.

The result of CFI pass 312 is symbolic CFI binary 313 that compiler 115 may persist, which concludes build phase 301. During build phase 301, <domain_a> and <domain_b> are unresolved symbols, and <domain_b> is symbol 165.

Eventually runtime phase 302 occurs, and loader 160 performs an instrumentation pass (on J2 and K2) shown as system loader 314 that also generates instrumentation L-M. L is initialization instrumentation that creates at least one pkey and associates each pkey with a respective memory page. L is not restrict access 190 for domain_b, but is an access restriction for domain_a (which is not necessarily domain_a in FIG. 2).

System loader 314 combines J2 with additional instrumentation to generate J3 that contains two MOV instructions. The second MOV instruction and the shift left (SHL) instruction cooperatively record that the current thread has entered from domain_a. More precisely, the current thread had permission to use domain_a when entering domain_b.

Instrumentation M defines set_domain_b that is transition subroutine 132. Set_domain_b contains the following instruction sequence.

1. Read pkey register unit (RDPKU) obtains the previous permission bits of all pkeys of the currently executing thread.
2. Exclusive or (XOR) revokes both (i.e. read and write) permissions of the previous domain (i.e. domain_a).
3. AND grants both (i.e. read and write) permissions of domain_b.
4. WRPKU activates the new permissions of all pkeys of the currently executing thread.

In other words, set_domain_b switches the current thread from a previous domain (i.e. domain_a) to domain_b. The instrumentation of FIG. 3 provides glue code (i.e. integration instrumentation) that enables domain_a to securely call into domain_b. Without additional instrumentation to similarly enable a hypothetical domain_c that shares the address space of domain_a and domain_b, domain_c would be unable to directly call into domain_b.

System loader 314 combines K2 with additional instrumentation to generate K3. Generation of J3 and K3 entails replacing unresolved symbols <domain_a> and <domain_b> with the respective address of domain pages A-B that are data pages that system loader 314 allocates at load (e.g. dynamic linking) time. Domain_pages[B] is page 175, and memory address 180 is the address of page 175, which is the address of the first byte in page 175.

The result of system load 314 is a fully resolved, linked, and relocated image of the executable program that is loaded (e.g. for execution) into the address space of process 315 that is protected by memory pkeys (MPK) and control-flow enforcement technology (CET).

4.0 Example Call Tree

Figure 4:
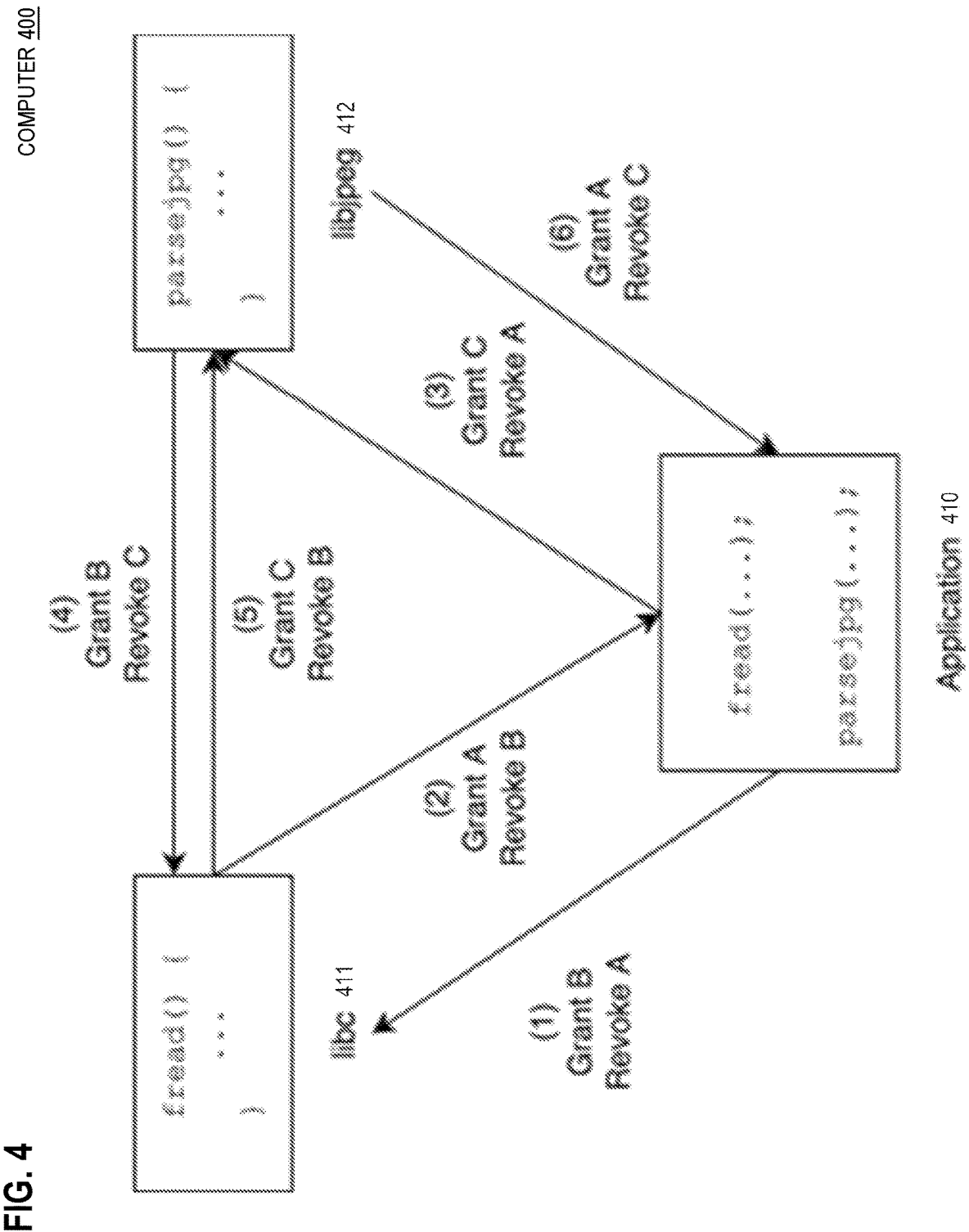
FIG. 4 is a flow diagram that depicts an example call tree.

FIG. 4 is a flow diagram that depicts an example call tree in example computer 400, in an embodiment. FIG. 3 is discussed with reference to FIGS. 1 and 3. Computer 400 may be an implementation of computer 100 or 300.

In this example, software application 410 uses software libraries 411-412. FIG. 4 shows runtime behavior that occurs after all instrumentation generation and configuration (e.g. phases 301-302 in FIG. 3) are finished. FIG. 4 shows function calls between components 410-412.

Application 410 corresponds to domain A (e.g. domain_a in FIG. 3). Library C (libc) 411 is the C programing language standard library. Libc 411 corresponds to domain B (e.g. domain_b in FIG. 3). Library joint photographic experts group (libjpeg) 412 corresponds to domain C.

FIG. 4 shows a sequence of call flow transitions 1-6 of a same executable thread. Each of odd numbered transitions 1, 3, and 5 represents the invocation of a function. Each of even numbered transitions 2, 4, and 6 represents the return from the function of a corresponding odd-numbered call transition. For example in transition 1, application 410 calls fread( ) in libc 411, which returns in transition 2.

As shown, components 410-412 have instrumentation that provides permission to call each other. For example, libjpeg 412 calls libc 411 in transition 4. As explained below, components 410-411 may contain instrumentation that permits calls from libjpeg 412.

The running program of computer 400 may contain and call unshown other software libraries, such as a demonstrative library Z. If components 410-411 do not contain similar instrumentation to permit calls from library Z, then attempts by library Z to call components 410-411 would be rejected by an access check (e.g. similar to access check 154) that accesses data that has a pkey that is configured to deny access. For example, libc 411 may have instrumentation that permits entry only from domains A and C, and library Z may instead be in domain Z.

In the shown embodiment, instrumentation ensures that the thread is not permitted access to more than one domain at a time. For example, transition 1 revokes the thread's access to domain A and grants the thread access to domain B. Conversely, transition 2 revokes access to domain B and restores access to domain A.

That temporary revocation of domain A may be important because, for example, unshown library Z may permit calls only directly from particular domain(s) (e.g. domain A) or particular component(s) (e.g. application 410) and never from libc 411 (or domain B). Thus, computer 400 may selectively permit or forbid direct calling between particular pairings of libraries or domains. Additionally, a permitted pairing may be bidirectional or unidirectional such that domain A can call domain Z and vice versa or not vice versa.

In an embodiment, subroutine 131 can be successfully called only from libc. In an embodiment, subroutine 131 is the main( ) function (i.e. entry point) of a C program.

Transitions 4-5 is an example of instrumentation that permits one (e.g. third party) library to call another (e.g. third party) library.

In a build-time (e.g. build phase 301 in FIG. 3) embodiment: a) source logic 110 is C programming language logic that defines application 410 that is a computer program, and b) computer 400 uses compiler 115 to compile C programing language source code of libraries 411-412.

5.0 Example Instrumentation Process

Figure 5:
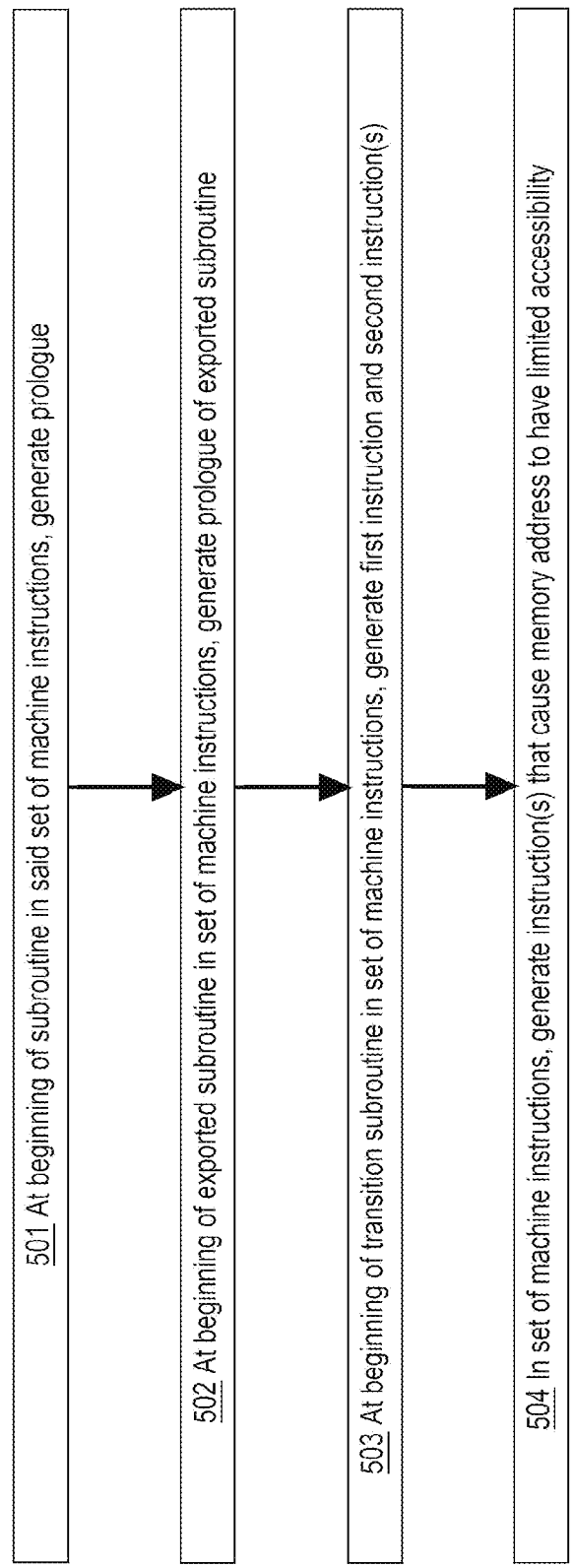
FIG. 5 is a flow diagram that depicts an example computer process that uses code generation techniques that instrument data protection for access control of subroutines invoked across module boundaries.

FIG. 5 is a flow diagram that depicts an example control flow integrity (CFI) process that an embodiment of computer 100, 200, or 300 may perform using code generation techniques that instrument data protection for access control of subroutines invoked across module boundaries. FIG. 5 is discussed with reference to FIGS. 1-3.

The process of FIG. 5 occurs partly at build time (e.g. build phase 301) and partly at runtime (e.g. runtime phase 302). Which steps occur at which phase and in what ordering depends on the embodiment. For demonstration, FIG. 5 reflects the ordering of activities shown in FIG. 3. In that case, steps 501-502 occur during build phase 301, and steps 503-504 occur during runtime phase 302.

At the beginning of subroutine 131 in machine instructions 120, step 501 generates prologue 141 as discussed earlier herein. For example, step 501 may generate K1 and transform K1 into K2 as shown in CFI pass 312.

At the beginning of exported subroutine 133 in machine instructions 120, step 502 generates prologue 143 as discussed earlier herein. For example, step 502 may generate J1 and transform J1 into J2 as shown in CFI pass 312.

At the beginning of transition subroutine 132 in machine instructions 120, step 503 generates a first instruction (e.g. end branch 152) and second instruction(s) (e.g. grant access 155) as discussed earlier herein. For example, step 503 may generate M as shown in system loader 314.

In machine instructions 120, step 504 generates instruction(s) that cause memory address 180 to have limited accessibility as discussed earlier herein. For example, step 504 may generate L as shown in system loader 314.

6.0 Example Loader Process

Figure 6:
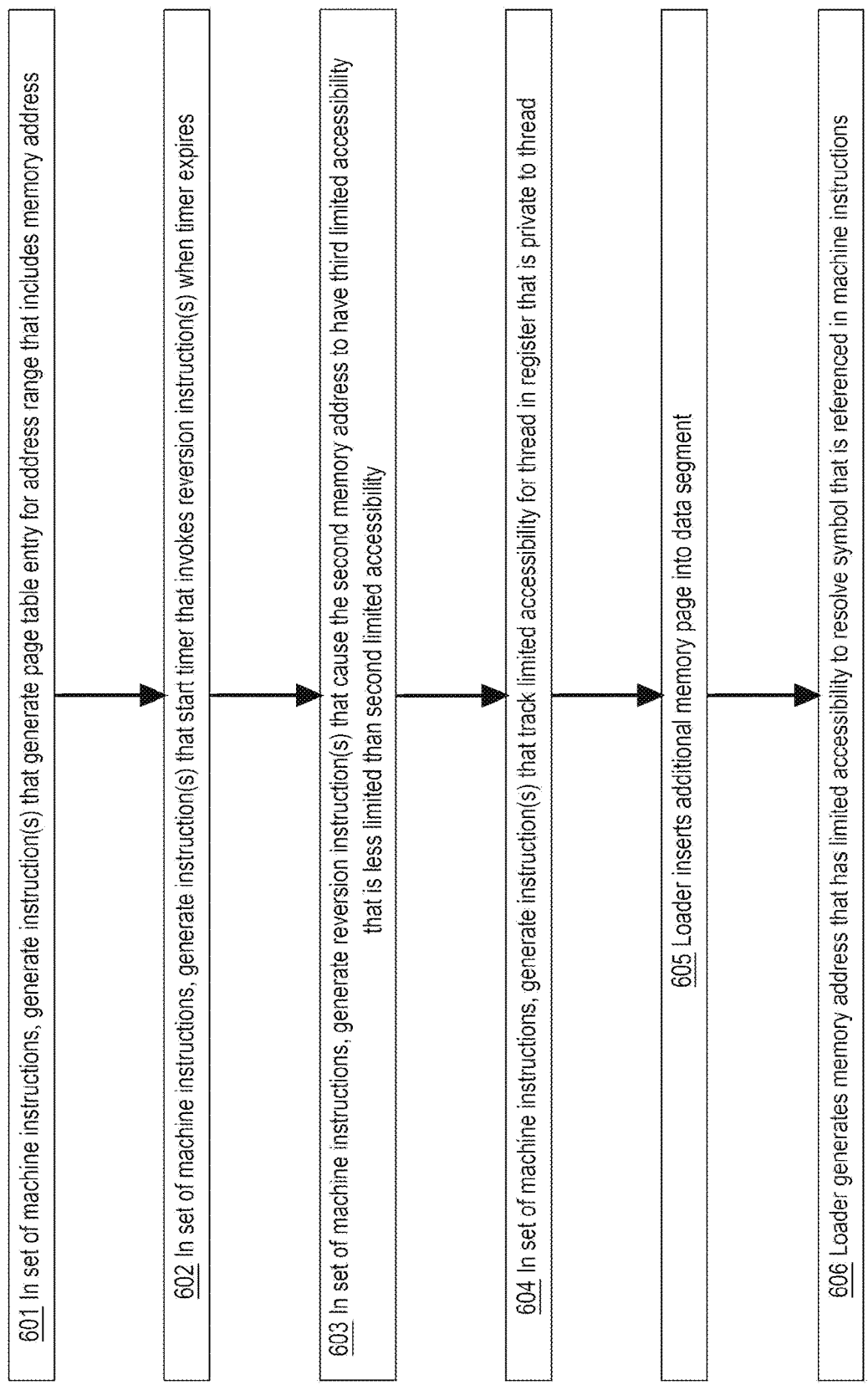
FIG. 6 is a flow diagram that depicts an example runtime process that may be performed by a loader or a dynamic linker.

FIG. 6 is a flow diagram that depicts an example runtime process that an embodiment of computer 100, 200, or 300 may be performed by loader 160 or a dynamic linker. FIG. 6 is discussed with reference to FIGS. 1-4. The steps of the processes of FIGS. 5-6 are complementary and may be combined or interleaved.

The process of FIG. 6 occurs at runtime (e.g. runtime phase 302). In what ordering the steps of the process of FIG. 6 occur depends on the embodiment. For demonstration, the process of FIG. 6 may be performed by system loader 314.

In machine instructions 120, step 601 generates instruction(s) that generate a page table entry for an address range that includes memory address 180. For example, step 601 may generate L in FIG. 3. L invokes the Unix memory map (mmap) system call that allocates page 175 and a corresponding page table entry.

Steps 602-603 cooperatively generate instrumentation that limits how much time a thread may spend in a domain (e.g. a library). In machine instructions 120, step 602 generates instruction(s) that start a watchdog timer that invokes reversion instruction(s) when the timer expires. Reversion instructions are discussed below. The timer starts when the thread calls into the domain. Which of subroutines 132-133 starts the timer depends on the embodiment.

As explained for FIG. 4, a thread that is currently in domain A may call into domain B, and that transition from domain A to domain B may execute instrumentation that, in transition 1 for the thread, revokes access to domain A and grants access to domain B. Also as explained for FIG. 4, that call eventually returns in transition 2 that reverts back to the previous domain, which revokes access to domain B and restores access to domain A. Transition 2 is an example of what is referred to herein as reversion, in which a thread reverts back to a previous domain.

For example, call transition 1 may make memory address 180 accessible to the thread, and reversion transition 2 may make memory address 180 inaccessible. In machine instructions 120, step 603 generates reversion instruction(s) in instrumentation that execute during transition 2. For example with instructions somewhat similar to M in FIG. 3, an instruction such as XOR or AND in the reversion instructions may clear (i.e. revoke) permission bits of a first pkey for domain B and set (i.e. restore) permission bits of a second pkey for domain A.

In an embodiment, reversion instructions are insensitive to the cause of the reversion. For example, reversion may be caused by: a) return from a call, either normally or abnormally (e.g. exception thrown) or b) watchdog timer expiration.

As explained earlier for M, RDPKRU obtains previous pkeys settings, and WRPKRU applies new pkeys settings, which may be behaviors of a transition subroutine and/or reversion instructions. In machine instructions 120, step 604 generates instruction(s) that track limited accessibility for a thread in register that is private to thread, such as PKRU as discussed earlier herein.

In an embodiment, steps 605-606 are performed by a loader that is explained earlier herein. Step 605 inserts page 175 into data segment 170. As explained earlier herein, data segment 170 is already defined in the relocatable image of an executable before loading. Before loading, data segment 170 (e.g. as configured by static linking) does not contain page 175. After step 605, data segment 170 does contain page 175. In other words, step 605 reconfigures data segment 170 in an innovative way that a state of the art loader would not do.

Because page 175 does not exist in the relocatable image, memory address 180 is undetermined before step 605 and only identified as an unresolved symbol as explained earlier herein. Step 606 generates memory address 180 based on new page 175, which may facilitate resolving the unresolved symbol such as by the loader during or after step 606.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
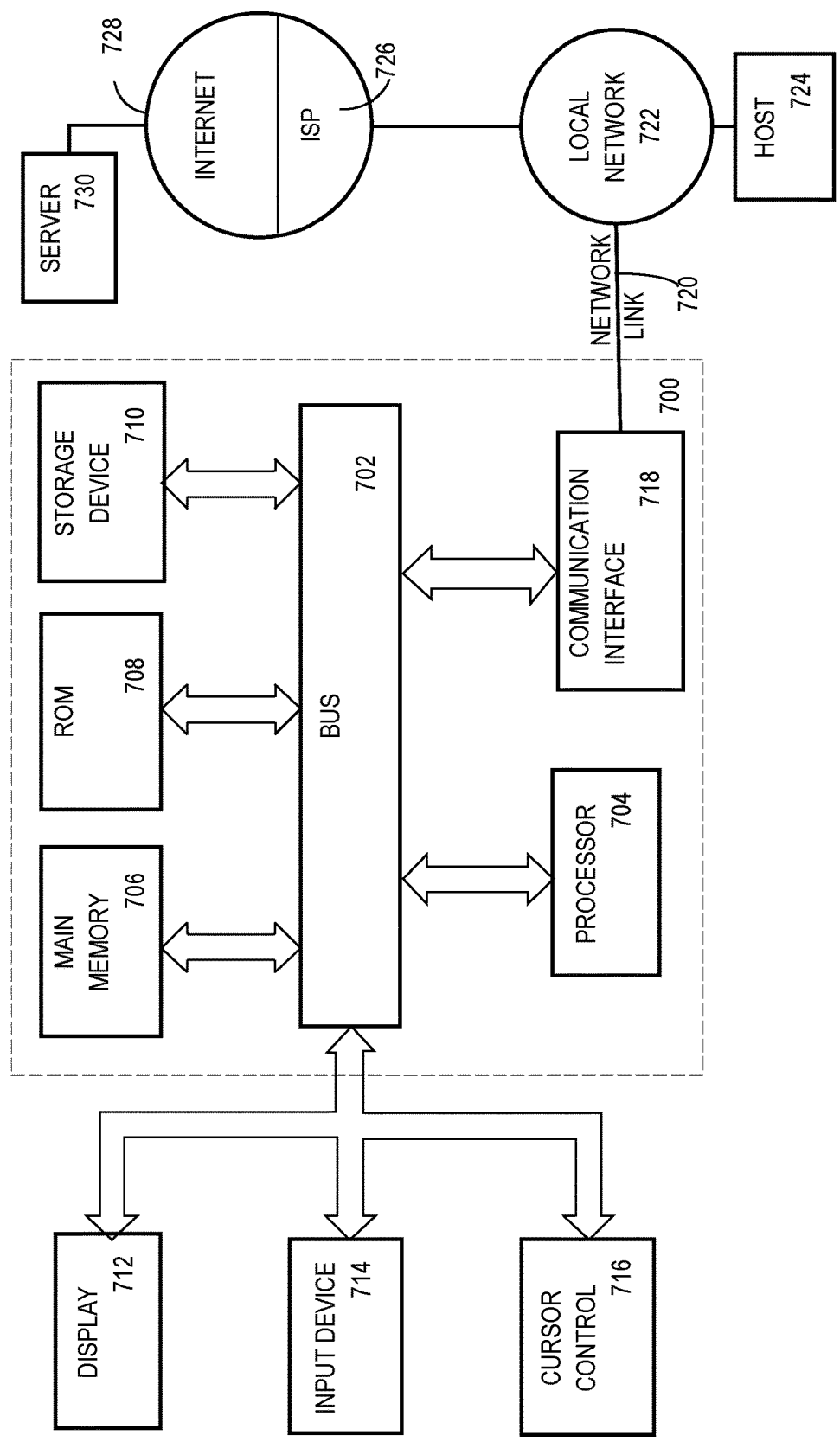
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
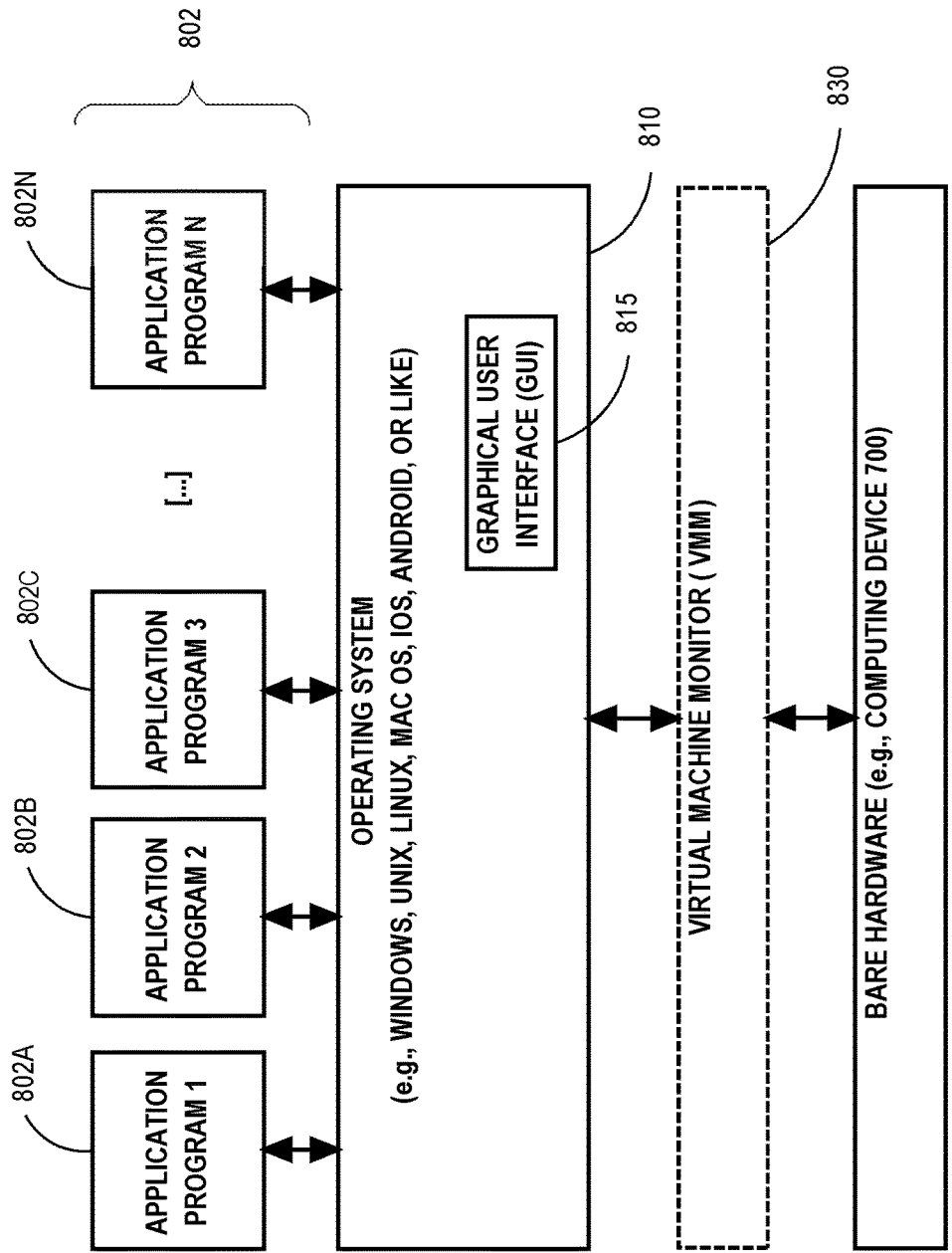
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, at the beginning of a subroutine that is implemented in a set of machine instructions, a prologue that contains:
a first instruction of the subroutine that indicates that the first instruction is a target of a control flow branch, and
a second instruction of the subroutine that verifies that a memory address is accessible; and
generating, in said set of machine instructions, one or more instructions that, when executed by a processor, cause said memory address to have limited accessibility.

2. The method of claim 1 wherein:
said generating said one or more instructions that cause the memory address to have limited accessibility comprises generating, at the beginning of a transition subroutine that is implemented in said set of machine instructions:
a first instruction at the beginning of the transition subroutine that indicates that the first instruction at the beginning of the transition subroutine is a target of a control flow branch, and
a second one or more instructions of the transition subroutine that grant access to the memory address.

3. The method of claim 2 further comprising while compiling source logic that does not contain the transition subroutine, a compiler generating a third one or more instructions that invoke the transition subroutine.

4. The method of claim 2 wherein:
said limited accessibility is a first limited accessibility;
the transition subroutine contains a third one or more instructions that cause a second memory address to have a second limited accessibility that is more limited than the first limited accessibility.

5. The method of claim 4 wherein said set of machine instructions comprises:
fourth one or more instructions that cause the second memory address to have a third limited accessibility that is less limited than the second limited accessibility;
fifth one or more instructions that start a timer that invokes said fourth one or more instructions when the timer expires.

6. The method of claim 2 wherein at least one selected from the group consisting of:
said second one or more instructions of the transition subroutine can be performed in user mode, and
said second one or more instructions of the transition subroutine do not flush a translation lookaside buffer (TLB).

7. The method of claim 1 further comprising a loader generating the memory address that has limited accessibility to resolve a symbol that is referenced in the set of machine instructions.

8. The method of claim 7 wherein said generating the memory address that has limited accessibility comprises the loader inserting an additional memory page into a data segment.

9. The method of claim 1 wherein:
said subroutine is a first subroutine;
generating, at the beginning of an exported subroutine that is implemented in said set of machine instructions, a prologue of the exported subroutine that contains:
a first instruction of the exported subroutine that indicates that the first instruction of the exported subroutine is a target of a control flow branch, and
a second one or more instructions of the exported subroutine that cause invocation of the first subroutine.

10. The method of claim 9 wherein said limited accessibility is denied unless the exported subroutine is invoked by a standard library that is part of a general purpose programing language.

11. The method of claim 10 wherein the first subroutine is a main entry point of a program.

12. The method of claim 9 wherein the first subroutine is not exported.

13. The method of claim 9 wherein:
the first subroutine is contained in a first library;
the exported subroutine is invoked from a second library.

14. The method of claim 1 wherein said cause the memory address to have limited accessibility comprises generating a page table entry for an address range that includes the memory address.

15. The method of claim 1 wherein said limited accessibility is for a particular thread.

16. The method of claim 15 wherein said limited accessibility for the particular thread is tracked by a register that is private to the particular thread.

17. The method of claim 1 wherein:
said memory address is a first memory address that has limited accessibility is a first software module;
a second memory address in a second software module is inaccessible to a particular thread;
the particular thread causing the second memory address in the second software module to become accessible to the particular thread causes the first memory address to become inaccessible to the particular thread.

18. The method of claim 1 wherein the first instruction of the subroutine and the second instruction of the subroutine are sequentially adjacent.

19. The method of claim 1 wherein the set of machine instructions comprises one selected from the group consisting of:
assembly language instructions,
low level virtual machine (LLVM) bitcode, and
instructions of an instruction set architecture (ISA) of a central processing unit (CPU).

20. The method of claim 1 wherein said memory address that has limited accessibility is not exported.

21. The method of claim 1 wherein said generating the prologue at the beginning of the subroutine comprises generating the prologue in a standard library that is part of a general purpose programing language.

22. One or more non-transitory computer-readable media storing instructions that, when executed by one or more processors, cause:
generating, at the beginning of a subroutine that is implemented in a set of machine instructions,
a prologue that contains:
a first instruction of the subroutine that indicates that the first instruction is a target of a control flow branch, and
a second instruction of the subroutine that verifies that a memory address is accessible; and
generating, in said set of machine instructions, one or more instructions that, when executed by a processor, cause said memory address to have limited accessibility.

23. The one or more non-transitory computer-readable media of claim 22 wherein:
said generating said one or more instructions that cause the memory address to have limited accessibility comprises generating, at the beginning of a transition subroutine that is implemented in said set of machine instructions:
- a first instruction at the beginning of the transition subroutine that indicates that the first instruction at the beginning of the transition subroutine is a target of a control flow branch, and
- a second one or more instructions of the transition subroutine that grant access to the memory address.

24. The one or more non-transitory computer-readable media of claim 22 storing instructions that cause a loader generating the memory address that has limited accessibility to resolve a symbol that is referenced in the set of machine instructions.

25. The one or more non-transitory computer-readable media of claim 22 wherein:
said subroutine is a first subroutine;
generating, at the beginning of an exported subroutine that is implemented in said set of machine instructions, a prologue of the exported subroutine that contains:
- a first instruction of the exported subroutine that indicates that the first instruction of the exported subroutine is a target of a control flow branch, and
- a second one or more instructions of the exported subroutine that cause invocation of the first subroutine.

26. The one or more non-transitory computer-readable media of claim 22 wherein said cause the memory address to have limited accessibility comprises generating a page table entry for an address range that includes the memory address.

27. The one or more non-transitory computer-readable media of claim 22 wherein said limited accessibility is for a particular thread.

28. The one or more non-transitory computer-readable media of claim 22 wherein:
said memory address is a first memory address that has limited accessibility is a first software module;
a second memory address in a second software module is inaccessible to a particular thread;
the particular thread causing the second memory address in the second software module to become accessible to the particular thread causes the first memory address to become inaccessible to the particular thread.

29. The one or more non-transitory computer-readable media of claim 22 wherein the first instruction of the subroutine and the second instruction of the subroutine are sequentially adjacent.

30. The one or more non-transitory computer-readable media of claim 22 wherein the set of machine instructions comprises one selected from the group consisting of:
assembly language instructions,
low level virtual machine (LLVM) bitcode, and
instructions of an instruction set architecture (ISA) of a central processing unit (CPU).

31. The one or more non-transitory computer-readable media of claim 22 wherein said memory address that has limited accessibility is not exported.

32. The one or more non-transitory computer-readable media of claim 22 wherein said generating the prologue at the beginning of the subroutine comprises generating the prologue in a standard library that is part of a general purpose programing language.

* * * * *